No. 619,414. Patented Feb. 14, 1899.
R. HOARE.
SPANNER.
(Application filed Aug. 30, 1898.)
(No Model.)
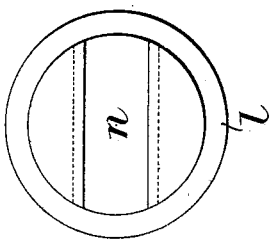
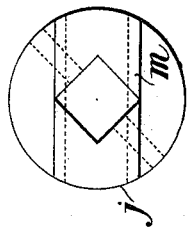
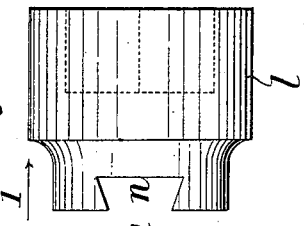
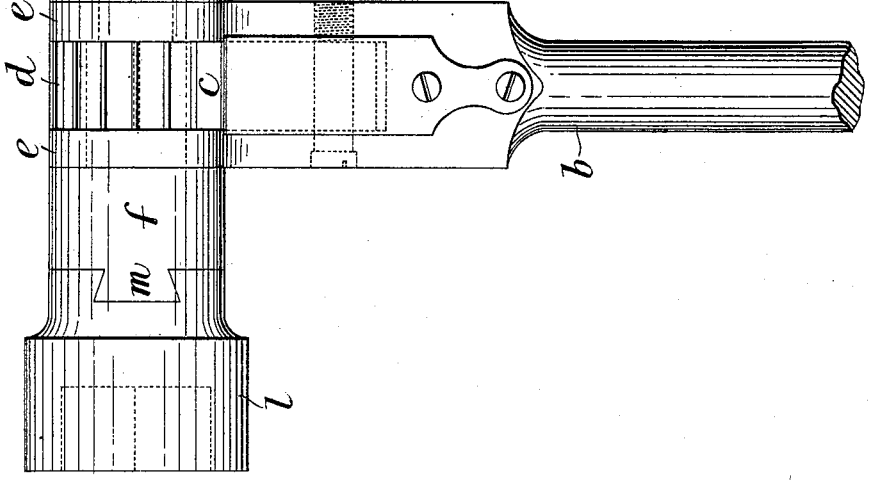
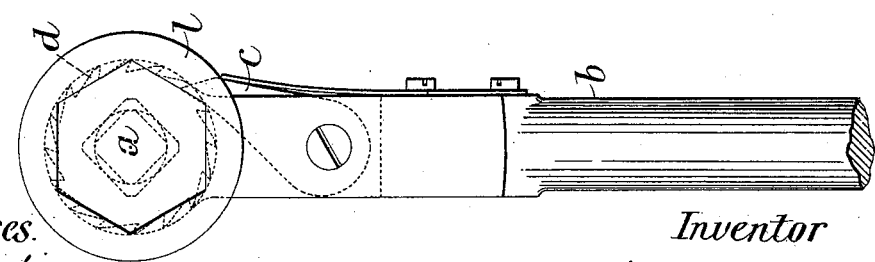
Witnesses.
Inventor

UNITED STATES PATENT OFFICE.

ROBERT HOARE, OF LONDON, ENGLAND, ASSIGNOR OF ONE-HALF TO THE ANGULAR HOLE MACHINE COMPANY, LIMITED, OF SAME PLACE.

SPANNER.

SPECIFICATION forming part of Letters Patent No. 619,414, dated February 14, 1899.

Application filed August 30, 1898. Serial No. 689,840. (No model.)

*To all whom it may concern:*

Be it known that I, ROBERT HOARE, a subject of the Queen of Great Britain, residing at London, England, have invented new and useful Improvements in Spanners, (for which I have applied for a patent in Great Britain, No. 2,908, dated February 4, 1898,) of which the following is a specification.

This invention relates to improvements in spanners, and has for its object to provide a simple spanner adapted to be used for turning nuts in places difficult of access by ordinary spanners and also for screwing and unscrewing nuts without any change of dogs or pawls or the employment of a square-toothed ratchet-wheel.

To enable my invention to be fully understood, I will describe the same by reference to the accompanying drawings, in which—

Figure 1 is a plan view of a spanner constructed according to my invention, and Fig. 2 is a side view of the same. Fig. 3 is a side view of one of the nut-boxes detached. Fig. 4 is a view looking in the direction of the arrow 1, Fig. 3; and Fig. 5 is an end view looking in the direction of the arrow 2, Fig. 2. Fig. 6 is a view of a detail.

$a$ is the spindle of the ratchet-brace, and $b$ is the lever, which works upon the said spindle and carries a spring-pawl $c$, designed to engage with the inclined teeth of a ratchet-wheel $d$, fixed upon the spindle, the said ratchet-wheel being arranged between the two limbs $e\ e$ of the lever.

As shown in the drawings, the spindle $a$ is formed with the boss $f$, with the two circular portions $g\ g$ upon which the limbs $e\ e$ rotate, with the square portion $h$ between the two circular portions upon which the ratchet-wheel $d$ is mounted, and with the square portion $i$, designed to carry the detachable boss $j$, Fig. 2, a pin $k$, passed through the boss $j$ and through a hole in the square portion $i$ in the spindle, serving to hold all the parts together when assembled.

$l\ l$ are nut-boxes designed to be detachably connected with the bosses $f$ and $j$, as shown in the drawings. Each of the said bosses is formed with a dovetailed projection $m$, and the bosses are each formed with a corresponding recess $n$, so that the said nut-boxes can be readily engaged with and disengaged from the bosses on the spindle. It is to be understood, however, that any suitable means may be provided for permitting of the said nut-boxes being readily connected with and disconnected from the spindle $a$. The object of providing for attaching the nut-boxes to both ends of the spindle is to allow a ratchet-brace, the spindle of which can be turned in one direction only, to be used for either screwing or unscrewing nuts, the nut-boxes being placed upon one end or the other of the said spindle, according to the direction in which the nut is to be turned. Where, however, a ratchet-brace is used which is capable of being turned in either direction, then obviously it will only be necessary to provide for attaching the nut-boxes to one end of the spindle.

Having now particularly described and ascertained the nature of my said invention and in what manner the same is to be performed, I declare that what I claim is—

1. In a spanner, the spindle described, having the dovetailed boss $f$, circular portions $g$, $g$, square portion $h$, and perforated square portion $i$, as and for the purposes set forth.

2. In a spanner, a spindle having a fixed boss integral with one of its ends and a removable boss at its other end, nut-boxes each removable severally from its boss, the lever mounted on the spindle, and the ratchet-wheel, all substantially as shown and described.

3. In a spanner, the combination with the spindle $a$, having integral therewith a boss made with a dovetailed projection at its end, a nut-box having a recess corresponding to such dovetail, and a removable boss at the other end of the spindle adapted to receive and support a nut-box.

4. The combination with a spindle having a boss $f$, two circular portions $g$, $g$, a square portion $h$, a perforated boss $j$, and its pin, and a dovetailed projection $m$, of a ratchet-wheel with inclined teeth, the lever $b$, and its spring-pawl, and the detachable nut-boxes $l\ l$, adapted for engagement with the bosses $f, j$, all substantially as set forth.

ROBERT HOARE.

Witnesses:
 JOHN E. BOUSFIELD,
 A. ALBUTT.